(12) United States Patent
Lunttila et al.

(10) Patent No.: US 9,819,451 B2
(45) Date of Patent: Nov. 14, 2017

(54) METHOD AND APPARATUS FOR DETERMINING RESOURCE INDEX INFORMATION

(75) Inventors: Timo Erkki Lunttila, Espoo (FI); Esa Tapani Tiirola, Kempele (FI)

(73) Assignee: Nokia Solutions and Networks Oy, Espoo (FI)

( * ) Notice: Subject to any disclaimer, the term of this patent is extended or adjusted under 35 U.S.C. 154(b) by 615 days.

(21) Appl. No.: 13/521,563

(22) PCT Filed: Dec. 29, 2010

(86) PCT No.: PCT/EP2010/070877
§ 371 (c)(1),
(2), (4) Date: Aug. 16, 2012

(87) PCT Pub. No.: WO2011/083068
PCT Pub. Date: Jul. 14, 2011

(65) Prior Publication Data
US 2012/0320844 A1 Dec. 20, 2012

(30) Foreign Application Priority Data
Jan. 11, 2010 (GB) .................................. 1000333.3

(51) Int. Cl.
*H04L 1/16* (2006.01)
*H04L 5/00* (2006.01)

(52) U.S. Cl.
CPC ............ *H04L 1/1607* (2013.01); *H04L 5/003* (2013.01)

(58) Field of Classification Search
CPC ............................. H04L 5/003; H04L 1/1607
USPC ........................................................ 370/329
See application file for complete search history.

(56) References Cited

U.S. PATENT DOCUMENTS

| 2009/0268685 A1* | 10/2009 | Chen et al. .................. 370/329 |
| 2010/0202389 A1* | 8/2010 | Cai ..................... H04W 72/042 370/329 |
| 2011/0034175 A1* | 2/2011 | Fong ..................... H04B 7/024 455/450 |

(Continued)

FOREIGN PATENT DOCUMENTS

| CN | 101489255 A | 7/2009 |
| CN | 101588224 A | 11/2009 |

(Continued)

OTHER PUBLICATIONS

Huawei, PUCCH design for carrier aggregation, 3GPP Draft R1-093838 3GPP TSG-RAN WG1 meeting #58bis, Oct. 12-16, 2009, pp. 1-6.*

(Continued)

*Primary Examiner* — Andrew Lai
*Assistant Examiner* — Andrew C Lee
(74) *Attorney, Agent, or Firm* — Harrington & Smith (57) ABSTRACT

A method including determining resource index information which defines a position for acknowledgement information in a first channel, said acknowledgment information being sent in response to at least one of component carrier of a second channel, said resource index information being determined in response to at least one parameter dependent on allocation of resources of said second channel and on at least one parameter relating to configuration of said first channel.

26 Claims, 7 Drawing Sheets

(56) References Cited

U.S. PATENT DOCUMENTS

| | | | |
|---|---|---|---|
| 2011/0134968 A1* | 6/2011 | Han | H04L 5/0023 375/146 |
| 2011/0142000 A1* | 6/2011 | Han | H04L 5/0053 370/329 |
| 2011/0216733 A1* | 9/2011 | Han | H04L 5/0007 370/329 |
| 2011/0292900 A1* | 12/2011 | Ahn et al. | 370/329 |

FOREIGN PATENT DOCUMENTS

| | | |
|---|---|---|
| WO | WO 2010/110598 A2 | 9/2010 |
| WO | WO 2010/012393 A1 | 10/2010 |
| WO | WO 2010/114237 A1 | 10/2010 |
| WO | WO 2011/019795 A1 | 2/2011 |

OTHER PUBLICATIONS

3GPP TSG RAN WG1 Meeting #57; R1-091810; *PUCCH design for carrier aggregation* ; San Francisco, USA, May 4-8, 2009; Agenda Item: 15.4; Source: Huawei (8 pages).

R1-091427 "Uplink Control Channel Design for LTE-Advanced" TSG RAN WG1# 56bis, Mar. 23-27, 2009 Seoul Korea (ZTE), (6 pages).

R1-091204: "UL Control Channel Design to Support Carrier Aggregation", 3GPP TSG RAN WG1 #56bis Seoul Korea Mar. 23-27, 2009 (ZTE), (6 pages).

R1-092535, 3GPP TSG-RAN WG1 Meeting #57bis, Jun. 29-Jul. 3, 2009 Los Angeles, USA, "UL ACK/NACK transmission on PUCCH for carrier aggregation", Panasonic, 4 pgs.

R1-093820, TSG-RAN WG1 #58bis, Miyazaki, Japan, Oct. 12-16, 2009, "Uplink Control Channel Design for LTE-Advanced", ZTE, 4 pgs.

R1-093838, 3GPP TSG RAN WG1 Meeting #58bis, Miyazaki, Japan, Oct. 12-16, 2009, "PUCCH design for carrier aggregation", Huawei, 6 pgs.

R1-093905, 3GPP TSG RAN WG1 Meeting #58bis, Miyazaki, Japan, Oct. 12-16, 2009, "UL control signaling for carrier aggregation", Nokia Siemens Networks, Nokia, 4 pgs.

R1-094421, 3GPP TSG RAN WG1 Meeting #59, Jeju, South Korea, Nov. 9-13, 2009, "Final Report of 3GPP TSG RAN WG1 #58bis v1.0.0, (Myazaki, Japan Oct. 12-16, 2009)", MCC Support, 90 pgs.

R1-094739, TSG-RAN WG1 #58bis, Jeju, Korea, Nov. 9-13, 2009, "ACK/NACK Design for LTE-Advanced" ZTE, 7 pgs.

R1-093943; Panasonic; "PUCCH resource allocation schemes for carrier aggregation"; 3GPP TSG RAN WG1 Meeting #58bis; Miyazaki, Japan, Oct. 12-16, 2009.

* cited by examiner

| CCE | CC_index 0 | 1 | 2 | 3 |
|---|---|---|---|---|
| 0 | 0 | 1 | 2 | 3 |
| 1 | 0 | 1 | 2 | 3 |
| 2 | 1 | 2 | 3 | 4 |
| 3 | 1 | 2 | 3 | 4 |
| 4 | 2 | 3 | 4 | 5 |
| 5 | 2 | 3 | 4 | 5 |
| 6 | 3 | 4 | 5 | 6 |
| 7 | 3 | 4 | 5 | 6 |
| 8 | 4 | 5 | 6 | 7 |
| 9 | 4 | 5 | 6 | 7 |
| 10 | 5 | 6 | 7 | 8 |
| 11 | 5 | 6 | 7 | 8 |
| 12 | 6 | 7 | 8 | 9 |
| 13 | 6 | 7 | 8 | 9 |
| 14 | 7 | 8 | 9 | 10 |
| 15 | 7 | 8 | 9 | 10 |
| 16 | 8 | 9 | 10 | 11 |
| 17 | 8 | 9 | 10 | 11 |
| 18 | 9 | 10 | 11 | 12 |
| 19 | 9 | 10 | 11 | 12 |
| 20 | 10 | 11 | 12 | 13 |
| 21 | 10 | 11 | 12 | 13 |
| 22 | 11 | 12 | 13 | 14 |
| 23 | 11 | 12 | 13 | 14 |
| 24 | 12 | 13 | 14 | 15 |
| 25 | 12 | 13 | 14 | 15 |
| ... | ... | ... | ... | ... |

FIG 9

BW1 = 10 CCEs for PCFICH 1
BW2 = 5 CCEs for PCFICH 1

CC-Shift depends on the CC bandwidth

ComressionFactor could potentially be fixed

| CCE | CC index DL#2 (BW 1) | DL#3 (BW 2) | DL#4 (BW 2) | DL#5 (BW 1) |
|---|---|---|---|---|
| 0 | 0 | 10 | 15 | 20 |
| 1 | 1 | 11 | 16 | 21 |
| 2 | 2 | 12 | 17 | 22 |
| 3 | 3 | 13 | 18 | 23 |
| 4 | 4 | 14 | 19 | 24 |
| 5 | 5 | 15 | 20 | 25 |
| 6 | 6 | 16 | 21 | 26 |
| 7 | 7 | 17 | 22 | 27 |
| 8 | 8 | 18 | 23 | 28 |
| 9 | 9 | 19 | 24 | 29 |
| 10 | 10 | 20 | 25 | 30 |
| 11 | 11 | 21 | 26 | 31 |
| 12 | 12 | 22 | 27 | 32 |
| 13 | 13 | 23 | 28 | 33 |
| 14 | 14 | 24 | 29 | 34 |
| 15 | 15 | 25 | 30 | 35 |
| 16 | 16 | 26 | 31 | 36 |
| 17 | 17 | 27 | 32 | 37 |
| 18 | 18 | 28 | 33 | 38 |
| 19 | 19 | 29 | 34 | 39 |
| 20 | 20 | 30 | 35 | 40 |
| 21 | 21 | 31 | 36 | 41 |
| 22 | 22 | 32 | 37 | 42 |
| 23 | 23 | 33 | 38 | 43 |
| 24 | 24 | 34 | 39 | 44 |
| 25 | 25 | 35 | 40 | 45 |
| ... | ... | ... | ... | ... |

METHOD AND APPARATUS FOR DETERMINING RESOURCE INDEX INFORMATION

The invention relates to a method and apparatus and in particular but not exclusively to a method and apparatus for use in an aggregated carrier environment.

A communication system can be seen as a facility that enables communication sessions between two or more entities such as mobile communication devices and/or other stations. The communications may comprise, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. Users may also be provided broadcast or multicast content. Non-limiting examples of the content include downloads, television and radio programs, videos, advertisements, various alerts and other information.

A communication system can be provided for example by means of a communication network and one or more compatible communication devices. The communication system and associated devices typically operate in accordance with a given standard or specification which sets out what the various entities associated with the system are permitted to do and how that should be achieved. For example, the standard or specification may define if a communication device is provided with a circuit switched carrier service or a packet switched carrier service or both, and how the carriers are configured. Communication protocols and/or parameters which shall be used for the connection are also typically defined. For example, the manner how the communication device can access resources provided by the communication system and how communication shall be implemented between communicating devices, the elements of the communication network and/or other communication devices is typically based on predefined communication protocols.

In a wireless communication system at least a part of communications between at least two stations occurs over a wireless link. Examples of wireless systems include public land mobile networks (PLMN), satellite based communication systems and different wireless local networks, for example wireless local area networks (WLAN). The wireless systems can typically be divided into cells, and are therefore often referred to as cellular systems.

A user can access the communication system by means of an appropriate communication device. A communication device of a user is often referred to as user equipment (UE). A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

A carrier may comprise a composite carrier, i.e. a carrier that is provided by a plurality of sub or component carriers. Composite carriers may be provided by utilising what is known as carrier aggregation. In carrier aggregation a plurality of carriers are aggregated to increase bandwidth. Such carriers are known as aggregated carriers, each aggregated carrier comprising a plurality of component carriers. Aggregated carriers can be adjacent in frequency or alternatively, or located in non-adjacent frequencies.

One proposed architecture is known as the long-term evolution (LTE) of the Universal Mobile Telecommunications System (UMTS) radio-access technology and that is being standardized by the $3^{rd}$ Generation Partnership Project (3GPP). The various development stages of the 3GPP LTE specifications are referred to as releases. The aim of the standardization is to achieve a communication system with, for example, reduced latency, higher user data rates, improved system capacity and coverage, and reduced cost for the operator. A further development of the LTE is referred to as LTE-Advanced. The LTE-Advanced aims to provide further enhanced services by means of even higher data rates and lower latency with reduced cost. A feature of the LTE-Advanced is that it is capable of providing aggregated carriers.

Uplink ACK/NACKs (acknowledgements/negative acknowledgments) are provided on an uplink corresponding to downlink packets. ACK/NACKs are part of the signalling related to Hybrid ARQ (automatic repeat requests). With carrier aggregation it is possible to transmit/receive on multiple component carriers (CC) at the same time in both uplink and downlink. The number of downlink and uplink component carriers may not be the same. By way of example only, there may be one uplink component carrier but a plurality of downlink component carriers. Separate transport blocks (or transport block pairs in the case of MIMO (multiple input multiple output) with spatial multiplexing) may be transmitted on each of the carriers. It has been proposed to signal separate component carrier specific ACK/NACKs for each downlink carrier.

The signalling may take place on the uplink channel PUCCH (physical uplink control channel) if the user equipment (UE) is not transmitting data. Otherwise the signalling may happen on the PUSCH (physical uplink shared channel).

STATEMENT OF INVENTION

According to a first aspect of the present invention, there is provided a method comprising determining resource index information which defines a position for acknowledgement information in a first channel, said acknowledgment information being sent in response to at least one of component carrier of a second channel, said resource index information being determined in response to at least one parameter dependent on allocation of resources of said second channel and on at least one parameter relating to configuration of said first channel.

According to a second aspect of the present invention, there is provided a method comprising receiving a plurality of downlink component carriers; and providing acknowledgment information for each of said component carriers on a common uplink component carrier.

According to a third aspect of the present invention, there is provided an apparatus comprising means for determining resource index information which defines a position for acknowledgement information in a first channel, said acknowledgment information being sent in response to at least one component carrier of a second channel, said resource index information being determined in response to at least one parameter dependent on allocation of resources of said second channel and on at least one parameter relating to configuration of said first channel.

According to a fourth aspect of the present invention, there is provided an apparatus comprising means for receiving a plurality of downlink component carriers; and means for providing acknowledgment information for each of said component carriers on a common uplink component carrier.

According to a fifth aspect of the present invention, there is provided an apparatus comprising a processor configured to determining resource index information which defines a position for acknowledgement information in a first channel, said acknowledgment information being sent in response to at least one of component carrier of a second channel, said resource index information being determined in response to at least one parameter dependent on allocation of resources of said second channel and on at least one parameter relating to configuration of said first channel; and a signal information generator configured to use said determined resource index information to generate signal information.

According to a sixth aspect of the present invention, there is provided an apparatus comprising at least one processor; and at least one memory including computer program code, the at least one memory and the computer program code configured to, with the at least one processor, cause the apparatus to at least to perform: determining resource index information which defines a position for acknowledgement information in a first channel, said acknowledgment information being sent in response to at least one of component carrier of a second channel, said resource index information being determined in response to at least one parameter dependent on allocation of resources of said second channel and on at least one parameter relating to configuration of said first channel.

Various other aspects and further embodiments are also described in the following detailed description and in the attached claims.

The invention will now be described in further detail, by way of example only, with reference to the following examples and accompanying drawings, in which.

In the following certain exemplifying embodiments are explained with reference to wireless or mobile communication systems serving mobile communication devices. Before explaining in detail the certain exemplifying embodiments, certain general principles of a wireless communication system and mobile communication devices are briefly explained with reference to FIGS. 1 and 2 to assist in understanding the technology underlying the described examples.

A communication device can be used for accessing various services and/or applications provided via a communication system. In wireless or mobile communication systems the access is provided via an access interface between mobile communication devices 1 and an appropriate wireless access system 10. A mobile device 1 can typically access wirelessly a communication system via at least one base station 12 or similar wireless transmitter and/or receiver node of the access system. A base station site typically provides one or more cells of a cellular system. In the FIG. 1 example the base station 12 is configured to provide a cell, but could provide, for example, three sectors, each sector providing a cell. Each mobile device 1 and base station may have one or more radio channels open at the same time and may receive signals from more than one source.

Figure 1:
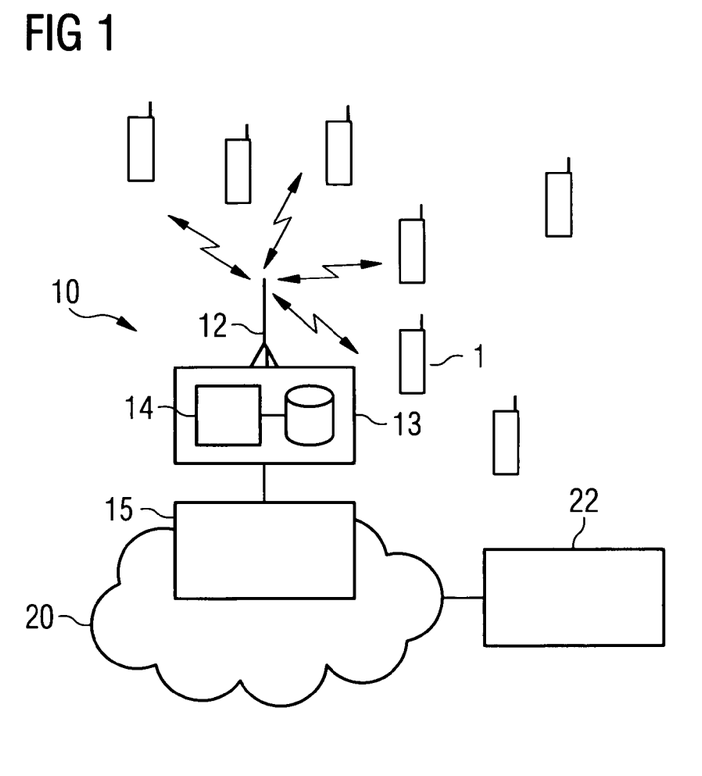
FIG. 1 shows an example of a communication system in which the embodiments of the invention may be implemented.

A base station has and is typically controlled by at least one appropriate controller so as to enable operation thereof and management of mobile communication devices in communication with the base station. The control entity can be interconnected with other control entities. In FIG. 1 the controller is shown to be provided by block 13. The controller is typically provided with memory capacity and at least one data processor 14. It shall be understood that the control functions may be distributed between a plurality of controller units.

In the FIG. 1 example the base station node 12 is connected to a data network 20 via an appropriate gateway 15. A gateway function between the access system and another network such as a packet data network may be provided by means of any appropriate gateway node, for example a packet data gateway and/or an access gateway. A communication system may thus be provided by one or more interconnect networks and the elements thereof, and one or more gateway nodes may be provided for interconnecting various networks.

A communication device can be used for accessing various services and/or applications. The communication devices can access the communication system based on various access techniques, such as code division multiple access (CDMA), or wideband CDMA (WCDMA). The latter technique is used by communication systems based on the third Generation Partnership Project (3GPP) specifications. Other examples include time division multiple access (TDMA), frequency division multiple access (FDMA), space division multiple access (SDMA) and so on. A non-limiting example of mobile architectures where the herein described principles may be applied is known as the Evolved Universal Terrestrial Radio Access Network (E-UTRAN). Non-limiting examples of appropriate access nodes are a base station of a cellular system, for example what is known as NodeB or enhanced NodeB (eNB) in the vocabulary of the 3GPP specifications. The eNBs may provide E-UTRAN features such as user plane Radio Link Control/Medium Access Control/Physical layer protocol (RLC/MAC/PHY) and control plane Radio Resource Control (RRC) protocol terminations towards mobile communication devices. Other examples include base stations of systems that are based on technologies such as wireless local area network (WLAN) and/or WiMax (Worldwide Interoperability for Microwave Access).

Figure 2:
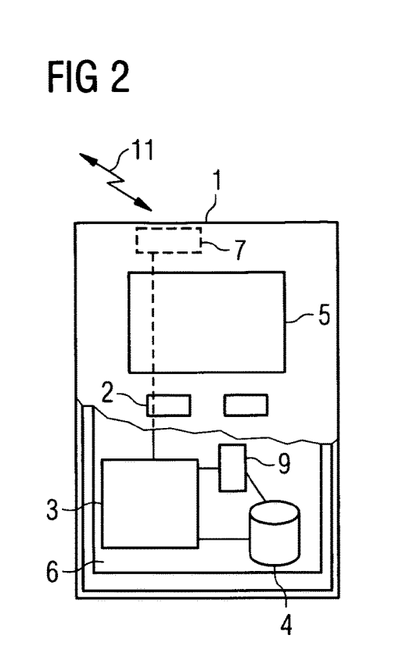
FIG. 2 shows an example of a communication device.

FIG. 2 shows a schematic, partially sectioned view of a communication device 1 that can be used for communication on a carrier 11 comprising a plurality of component carriers, for example with at least one base station. An appropriate mobile communication device may be provided by any device capable of sending and receiving radio signals. Non-limiting examples include a mobile station (MS), a portable computer provided with a wireless interface card or other wireless interface facility, personal data assistant (PDA) provided with wireless communication capabilities, or any combinations of these or the like.

A mobile communication device may be used for voice and video calls, and/or for accessing service applications provided via a data network. The mobile device 1 may receive signals via appropriate apparatus for receiving and transmitting radio signals. In FIG. 2 a transceiver is designated schematically by block 7. The transceiver may be provided for example by means of a radio part and associated antenna arrangement. The antenna arrangement may be arranged internally or externally to the mobile device. A mobile device is also typically provided with at least one data processing entity 3, at least one memory 4 and other possible components 9 for use in tasks it is designed to perform. The data processing, storage and other entities can be provided on an appropriate circuit board and/or in chipsets. This feature is denoted by reference 6. The user may control the operation of the mobile device by means of a suitable user interface such as key pad 2, voice commands, touch sensitive screen or pad, combinations thereof or the like. A display 5, a speaker and a microphone are also typically provided. Furthermore, a mobile device may comprise appropriate connectors (either wired or wireless) to other devices and/or for connecting external accessories, for example hands-free equipment, thereto. The data processing entity may be configured to cause the generation of signal information for transmission by the user equipment.

Figure 3:
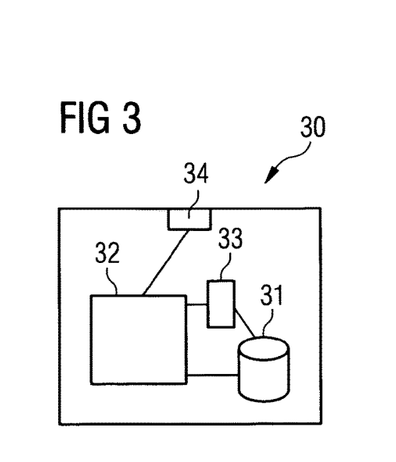
FIG. 3 shows an example of a controller for a base station.

FIG. 3 shows an example of a controller apparatus 30 comprising at least one memory 31, at least one data processing unit 32, 33 and an input/output interface 34. The controller 30 may be configured to execute an appropriate software code to provide the control functions as explained below in more detail. The controller 30 can be provided for controlling one single composite carrier or a number of composite carriers provided by a base station in accordance of the principles of the below explained embodiments. The controller apparatus may be provided in the base station or may be part of a different entity such as a controller. The controller may be configured to cause the generation of signal information for transmission by the base station.

Current proposals for carrier aggregation in LTE-A systems will now be explained briefly. In carrier aggregation two or more carriers, referred to as component carriers CC are aggregated such that a communication device may simultaneously receive (or transmit) one or multiple component carriers depending on its capabilities. For example, an LTE-Advanced mobile communication device with reception capability beyond 20 MHz can simultaneously receive on multiple component carriers. The carrier aggregation is at present considered for LTE-Advanced to support downlink transmission bandwidths larger than 20 MHz, but the use thereof is naturally not restricted by this. A requirement that has been proposed for LTE-A is that it should operate in spectrum allocations of different sizes including wider spectrum allocations than those of the current Release 8 LTE, e.g. up to 100 MHz, to achieve the peak data rate of 100 Mbit/s for high mobility and 1 Gbit/s for low mobility.

Figure 4:
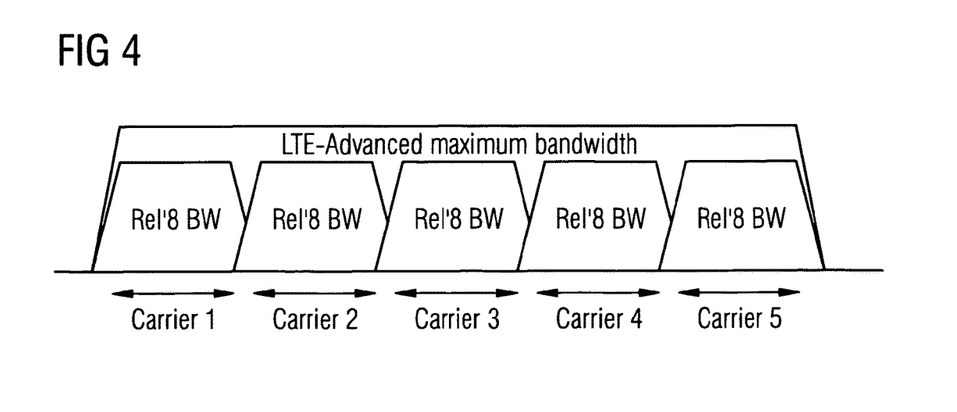
FIG. 4 shows an example of carrier aggregation.

FIG. 4 gives an example of the carrier aggregation. In the example a plurality Rel8 bandwidth "chunks", or component carriers, are combined together to form M×Rel8 bandwidth (BW). For example, given M=5, one would have 5×20 MHz=100 MHz. As mentioned above, Release 8 compatible communication devices can receive/transmit only on one component carrier. However, LTE-Advanced communication may also receive/transmit on multiple component carriers simultaneously, and thus reach higher bandwidths.

Some embodiments of the present invention relate to the signalling aspects of the ACK/NACK on the PUCCH. In some embodiments of the invention, a relationship between the uplink resource on the PUCCH with respect to the downlink carriers is provided.

In LTE-Rel, there are two ways of allocating the resources for ACK/NACK signalling on the PUCCH. The PUCCH resources can be derived either:

1. Implicitly in the case of dynamic scheduling. There is a one-to-one mapping between the index of the lowest CCE (control channel element) on the PDCCH (physical downlink control channel) and the index of the uplink ACK/NACK resource of the PUCCH; or 2. Explicitly in the case of (semi-)persistent scheduling. The PUCCH resource to be used for the ACK/NACK is signalled separately for each user equipment using the RRC (radio resource control) configuration.

With LTE-Advanced, the issue of carrier aggregation may need to be addressed in relation to the ACK/NACK signalling as the number of CCEs increases. In the extreme case of 5×20 MHz downlink carriers, there will be at maximum 5×80=300 (approximately) CCEs assuming that the PCFICH (physical control channel format indicator channel) equals 3, for example in the case of FDD (frequency division duplexing). In TDD (time division duplexing), the number of CCEs may be much higher.

In some cases, the downlink HARQ (hybrid automatic repeat request)—ACK/NACK is associated from more than one PDSCH (physical downlink shared channel), for example up to 9, and will be mapped into a single PUCCH uplink sub-frame.

The PCFICH may have a specific value on each component carrier, for example as suggested in 3GPP TSG RAN WG1 Meeting 58bis in Miyazaki, Japan (meeting minutes—R1-094421). If pure implicit one-to-one mapping is used, the PCFICH may have a direct impact on the number of ACK/NACK resources on the PUCCH. If the user equipment, for example failed to decode the PCFICH correctly, the numbering of the ACK/NACK resources may fail.

It should be appreciated that the carrier configuration may be asymmetric in some scenarios. For example there may be differing numbers of downlink and uplink component carriers. The number of uplink and downlink component carriers may be of any suitable number, depending on the application. In one scenario, there may be a single uplink component carrier whilst there are several downlink carriers.

In one proposal, the mapping of ACK/NACK of all downlink component carriers on a single UE specified uplink component carrier may be supported. This mode may be regarded as the so-called "default PUCCH configuration" in the case of CC aggregation.

Some embodiments of the present invention relate to the derivation of the index of the PUCCH ACK/NACK resource in the case of carrier aggregation.

In one embodiment, a simple implicit one-to-one mapping is used. This provides a one-to-one mapping from the CCEs to the ACK/NACK resources. Where for example the number of ACK/NACK resources required is high, this may correspond to a high number of PRBs (physical resource block) to be reserved for PUCCH. For example there may be 12, 18 or 36 ACK/NACK resources per PRB (depending on configuration).

The number of CCEs may depend on the value of the PCFICH. To be robust against errors in PCFICH reception, the PUCCH ACK/NACK resources may be reserved according to the maximum value of PCFICH. For example, the overhead needs to be set according to the worse case assumption, for example PCFICH=3.

In a second embodiment, explicit signalling of the resource is provided. When the number of RRC connected UEs is relatively high, a very large number of ACK/NACK resources need to be reserved with a correspondingly high uplink signalling overhead. This method therefore may be used where the number of UEs is relatively low. However, this method (i.e., CC aggregation) may be useful even where the number of UEs is relatively high.

In an alternative, if the same resources are assigned to a plurality of user equipment, the eNodeB may provide appropriate scheduling. Thus, the UEs with the same ACK/NACK resource are prevented from receiving downlink data in the same sub-frame.

In a further embodiment of the present invention, an implicit CCE to ACK/NACK resource mapping rule is provided which has a relatively low uplink overhead with relatively simple scheduler restrictions. Some embodiments of the present invention provide a configurable ACK/NACK resource space reserved jointly for a plurality of downlink CCs. This configurable resource space may be provided, in preferred embodiments on a single uplink CC. In alternative embodiments of the present invention, this configurable ACK/NACK resource space may be provided on a plurality of uplink CCs. In the following, the ACK/NAC resource space will be referred to as the dynamic cross-CC-ACK/NACK space.

The dynamic ACK/NACK space will comprise a first part which is the dynamic ACK/NACK space defined for example in LTE-Rel-8 as well as the dynamic cross-CC-ACK/NACK space.

In embodiments of the present invention, in the dynamic cross-CC-ACK/NACK space, some of the ACK/NACK channels are allowed to overlap by providing an intermediate mapping operation based on various input parameters. In this regard, reference is made to FIG. 5 which schematically shows a mapping rule generator and FIG. 10 which illustrates a method embodying the invention.

Figure 5:
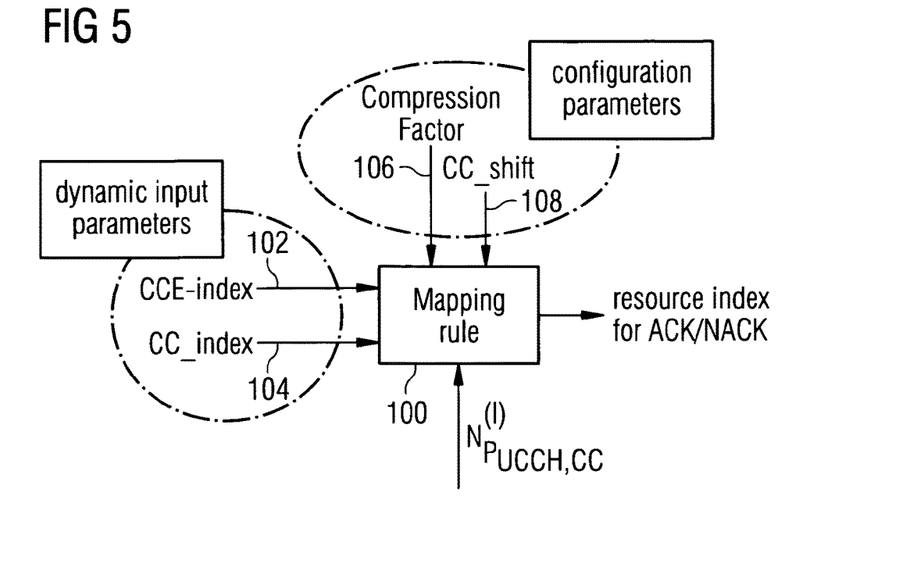
FIG. 5 shows a schematic representation of an embodiment of the present invention.

A mapping rule generator 100 is provided. The mapping rule generator receives dynamic input parameters 102 and 104 dependent on the PDDCH allocation. The first dynamic input parameter 102 comprises an index of a predefined CCE of the PDCCH scheduled to the UE. In one embodiment of the present invention, the predefined CCE is the lowest CCE index of the CCEs scheduled to that UE on the PDCCH. It should be appreciated that in alternative embodiments, any other CCE index may be the predefined CCE index. The second dynamic input parameter 104 is the CC index of the transmitting PDCCH In some embodiments only one of the first and second parameters is provided. Additionally or alternatively the dynamic input parameter may comprise one or more of: aggregation level (1, 2, 4, 8), sub-frame number, cell_ID, etc.

The mapping rule generator 100 also receives a first configuration parameter 106 and/or a second configuration parameter 108. The first configuration parameter 106 is a compression factor and the second configuration parameter is a CC_shift value. The configuration parameters provide the configurability for the resource allocation. The compression factor 106 defines the number of neighbouring PUCCH resources (CCEs) within a component carrier that share the same resource index. The CC_shift defines the separation between indices of PUCCH resources between adjacent component carrier indices. Additionally or alternatively the parameter may be a Rel-8 parameters, for example one or more parameters which defines the starting position of the existing (Rel-8) ACK/NACK resource space (eg $n_{PUCCH}^{(2)}$, $N_{PUCCH}^{(1)}$, and $N_{CS}^{(1)}$) This may be an option, for example in such case with no legacy UEs, where all the ACK/NACK may be located in the same CC.

It should be appreciated that in alternative embodiments of the present invention, other configuration parameters may be used and/or additional configuration parameters. For example, one configuration parameter may be the starting position of the dynamic cross-ACK/NACK space, that is $N_{PUCCH, CC}^{(1)}$ 105, where $N_{PUCCH, CC}^{(1)}$ is a pre-defined starting position of the dynamic cross-ACK/NACK space. This information may be signalled to the UE. Accordingly this information may be received by the UE.

Figure 10:
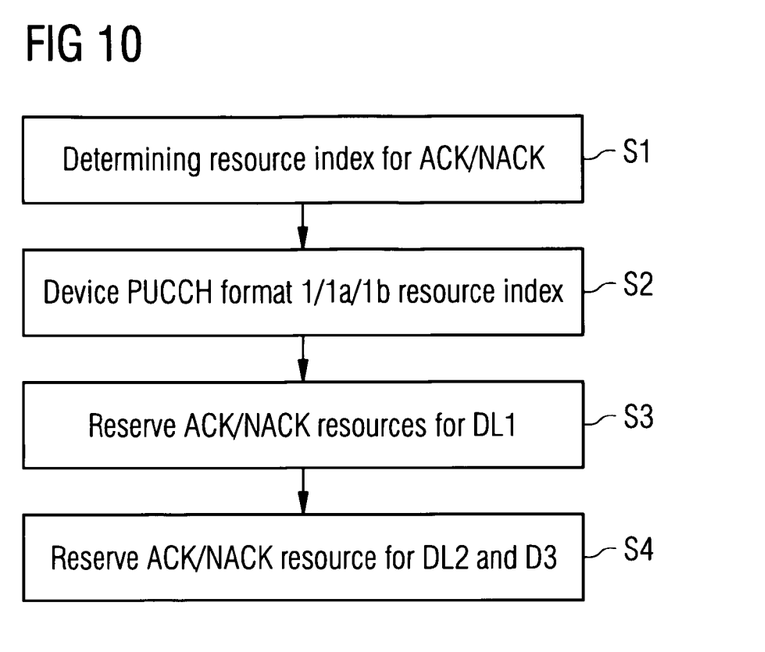
FIG. 10 shows a method embodying the invention.

Thus in step S1 of FIG. 10, the mapping rule generator 100 uses the dynamic input parameters and the configuration parameters to derive the relativistic ACK/NACK resource index corresponding to the given PDCCH/PDSCH allocation. The resource index belongs to the set (0, 1, 2 . . . ). It is also possible in some embodiments to have negative integer values for the resource indexes.

In step S2, The user equipment is arranged to derive at the logical PUCCH format 1/1a/1b resource index taking into account a given starting position and the calculated ACK/NACK resource index.

In one embodiment of the present invention, the mapping rule generator shown in FIG. 5 may be provided in the base station or other control entities. It should be appreciated that the mapping rule generator 100 may be a separate entity which is incorporated in the arrangement of FIG. 3 or may be provided by the processor shown in FIG. 3. In an alternative embodiment of the present invention, the circuitry shown in FIG. 5 may be included in the user equipment. The mapping generator is provided in the UE and/or the eNB. Preferably the mapping generator is provided in both the UE and the eNB.

Figure 6:
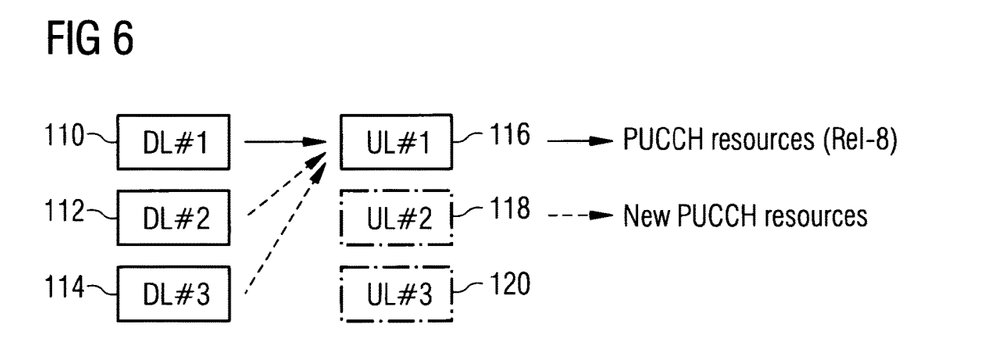
FIG. 6 illustrates a mapping between the downlink and uplink, in an embodiment of the invention.

In one embodiment, the dynamic cross-CC-ACK/NACK space may be configured only for predefined downlink component carriers. Reference is made to FIG. 6 which shows that three downlink component carriers 110, 112 and 114 form the user equipment downlink component carrier set. In FIG. 6, three uplink component carrier 116, 118 and 120 are shown. In the example shown, PUCCH resources for each of the three illustrated downlinks 110, 112 and 114 are reserved only from the first uplink CC 116. It should be appreciated that the user equipment may receive the PDCCH via the component carriers which are part of the user equipment downlink component carrier sets.

The ACK/NACK resources corresponding to the PDSCH scheduled via the first downlink CC 110 are reserved in step S3 from the existing PUCCH resource space (as for example defined in Release-8) reserved for the dynamic ACK/NACK.

The ACK/NACK resources corresponding to the PDSCH scheduled by the second and third downlink CCs 112 and 114 are reserved in step S4 from the dynamic cross-CC-ACK/NACK space, as described in relation to FIG. 5. These reserved resources are PUCCH resources and again are reserved in the first uplink CC 116. The ACK/NACKs are transmitted on the reserved resources.

Alternatively is also possible to reserve the ACK/NACK resources such that the ACK/NACK resource corresponding to the PDSCH scheduled via the first downlink CC 110 are reserved in step S3 from the existing PUCCH resource space in an implicit way (as for example defined in Release-8) reserved for the dynamic ACK/NACK whereas ACK/NACK resources corresponding to the PDSCH scheduled by the second and third downlink CCs 112 and 114 are reserved explicitly from another resource space, for example from the resource space reserved to persistent ACK/NACK and SRI. The explicit resource allocation may be realized using higher layer signalling.

It should be appreciated that FIG. 6 shows three downlink resources and three uplink CC resources. This is by way of example only and any other suitable number of uplink and downlink CC resources may be provided. In the example shown in FIG. 6, the downlink CC resources are shown as being mapped to the first uplink resource. It should be appreciated that this is by way of example and the downlink resources may be mapped to any of the other uplink CC resources.

The duplex spacing between the first uplink and the first downlink corresponds to that as defined for example in Rel 8.

One mapping rule embodying the invention may take into account a number of different criteria e.g., scalability, scheduler flexibility and PUCCH overhead and is given in equation 1 below.

$$n_{res} = \left\lfloor \frac{CCE}{CompressionFactor} \right\rfloor + (CC\_index) \cdot (CC\_shift), \quad \text{Eq. 1}$$

where CCE and CC_index are respectively the first control channel element index and the component carrier index of the corresponding PDCCH, $\lfloor \cdot \rfloor$ is the floor-operation and ($n_{res}$=cross-CC-ACK/NACK resource index).

It is noted that the CC_index corresponding to each DL CC may be explicitly configured e.g., during the UE-specific CC configuration. It is also possible to reuse the (DL) CIF (Carrier Indicator Field) parameter and the signalling required by the cross component carrier scheduling when configuring the CC_index (CC_index=CIF).

In some embodiments the size of $n_{res}$ can be limited towards a pre-defined maximum value, $N_{res}$. In these cases, $n_{res}$ can be defined as $$n_{res} = \left(\left\lfloor \frac{CCE}{CompressionFactor} \right\rfloor + (CC\_index) \cdot (CC\_shift)\right) \bmod N_{res}.$$

Figure 7:
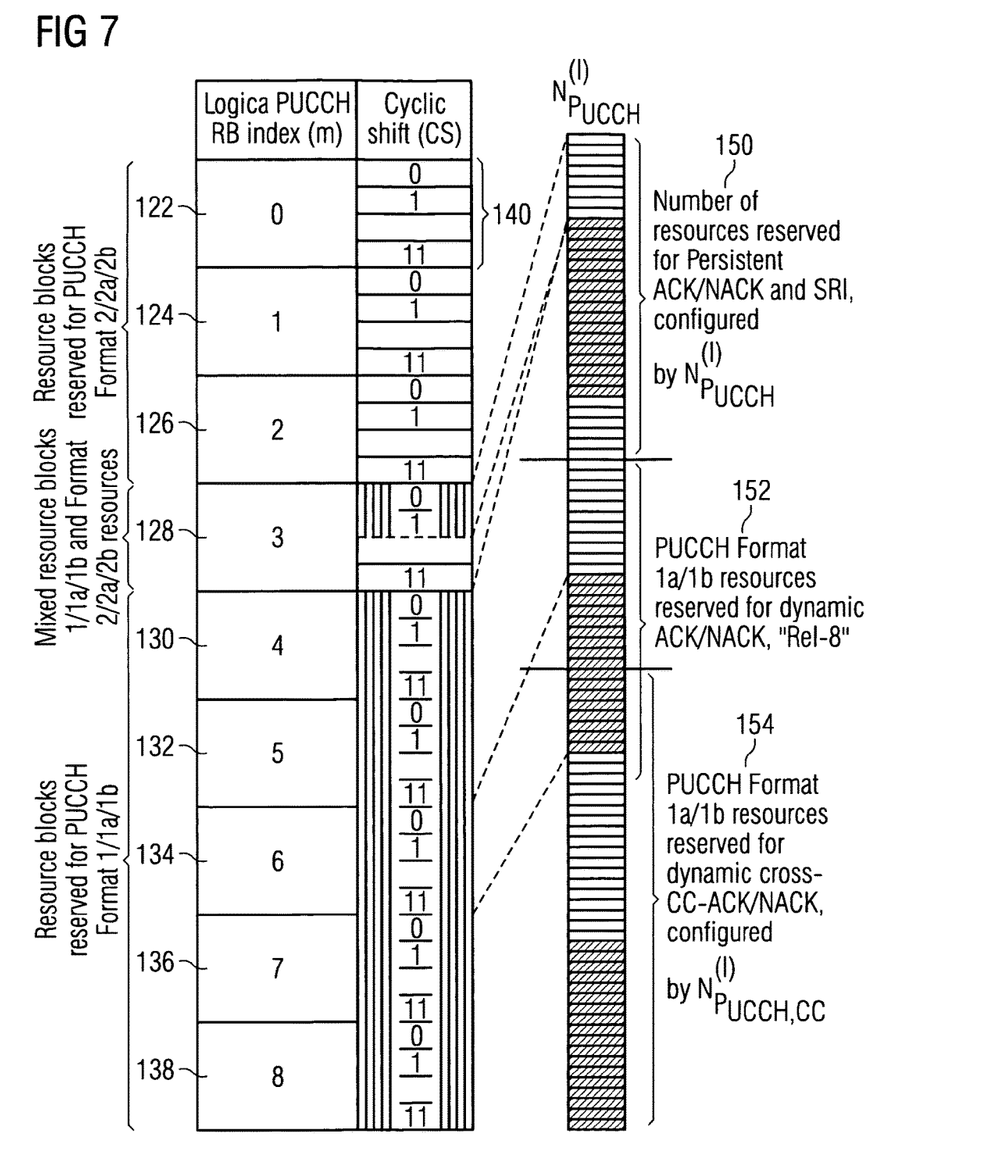
FIG. 7 shows a logical PUCCH structure in an embodiment of the invention.

Reference is now made to FIG. 7 which shows the logical PUCCH structure according to an embodiment of the invention. The PUCCH comprises 9 resource blocks 122 to 138 in this example. The first three resource blocks 122, 124 and 126 are reserved for PUCCH format 2/2a/2b.

The fourth resource block 128 is a mixed resource block for both formats 1/1a/1b and format 2/2a/2b (optional). The remaining 5 blocks 130 to 138 are reserved for PUCCH format 1/1a/1b.

Control signalling on the PUCCH uses cyclically shifted CAZAC (constant amplitude zero autocorrelation) sequences to provide code division multiplexing and to convey control information. For example, using CAZAC sequences of 12 symbols—equal to one physical resource block, may be BPSK or QPSK (binary or quadrature phase shift keying) modulated to provide one or two information bits per sequence. By allocating different cyclic shifts of the CAZAC sequence, it is possible to multiplex a plurality of different user equipment onto a given resource. As can be seen from FIG. 7, the 12 cyclic shifts 140 for each bearer are schematically indicated.

Format 1/1a/1b uses CAZAC sequence modulation and block wise spreading. Format 1/1a/1b carries one information symbol, for example 1 to 2 bits per slot. Format 2/2a/2b may convey 5 symbols per slot. Format 2/2a/2b uses only CAZAC sequence modulation and the main purpose of Format 2/2a/2b is to provide the physical resource for CQI (channel quality indicator). For example, this may provide 20 coded bits as well as the ACK/NACK(s) per sub-frame.

The UE derives the logical PUCCH Format 1/1a/1b resource index $n_{PUCCH}^{(1)}$ taking into account both pre-defined starting position and calculated relativistic ACK/NACK resource index into account. This is shown in Equation 3:

$$n_{PUCCH}^{(1)} = N_{PUCCH,CC}^{(1)} + n_{res}, \quad \text{Eq. 3}$$

where $N_{PUCCH,\ CC}^{(1)}$ is a pre-defined starting position.

It is possible to signal $N_{PUCCH,\ CC}^{(1)}$ explicitly e.g., as part of system information from the base station.

Another option is to derive $N_{PUCCH,\ CC}^{(1)}$ dynamically based on the instantaneous size of the dynamic ACK/NACK region of PUCCH. In this case dynamic cross-CC-ACK/NACK space is placed right after the existing dynamic ACK/NACK region.

$N_{PUCCH,\ CC}^{(1)}$ may be derived based on instantaneous PCFICH value of the "primary" DL CC, for example the first downlink CC 110, when the PDCCH was transmitted. The dynamic cross-ACK/NACK space may be placed right after the dynamic ACK/NACK region with PCFICH=1, 2 or 3 (so that the two ACK/NACK spaces will overlap with PCFICH>1 as shown in FIG. 7).

FIG. 7 shows an example where $N_{PUCCH,\ CC}^{(1)}$ has been explicitly configured. It is possible to set $N_{PUCCH,\ CC}^{(1)}$ in such that dynamic cross-ACK/NACK space is placed right after the dynamic ACK/NACK region with PCFICH=1 (although this is not the case in FIG. 7). This is due to the fact that eNB knows that number of CCEs with PCFICH=1. If $N_{PUCCH,\ CC}^{(1)}$ is explicitly signalled, then eNB can place dynamic cross-CC ACK/NACK region in any place as it is possible to trade-off between the scheduler restrictions and PUCCH overhead As shown in FIG. 7, the $n_{PUCCH}^{(1)}$ index is the resource index of PUCCH Format 1/1a/1b. In the illustrated part of this resource index, there is a first part 150 which provides a number of resources reserved for the ACK/NACK of the persistently scheduled PDSCH and scheduling request indicator, which is configured explicitly by the $n_{PUCCH}^{(1)}$.

There is a second region 152 which are the PUCCH format 1a/1b resources reserved for the dynamic ACK/NACK "Release 8" (the so-called regular dynamic ACK/NACK space) for dynamically scheduled PDSCH.

The third region 154 is the PUCCH format 1a/1b resources reserved for the dynamic cross-CC/ACK/NACK space. This has a region which overlaps the regular dynamic ACK/NACK space. The regions have odd and even RBs (each PRB contains predetermined (12/18/36) PUCCH Format 1/1a/1b resources, depending on configurations). The dotted lines show the PRB borders. As can be seen from FIG. 7, there are 18 PUCCH resources on each PRB carrying format 1/1a/1b signals in this particular example.

Figure 8:
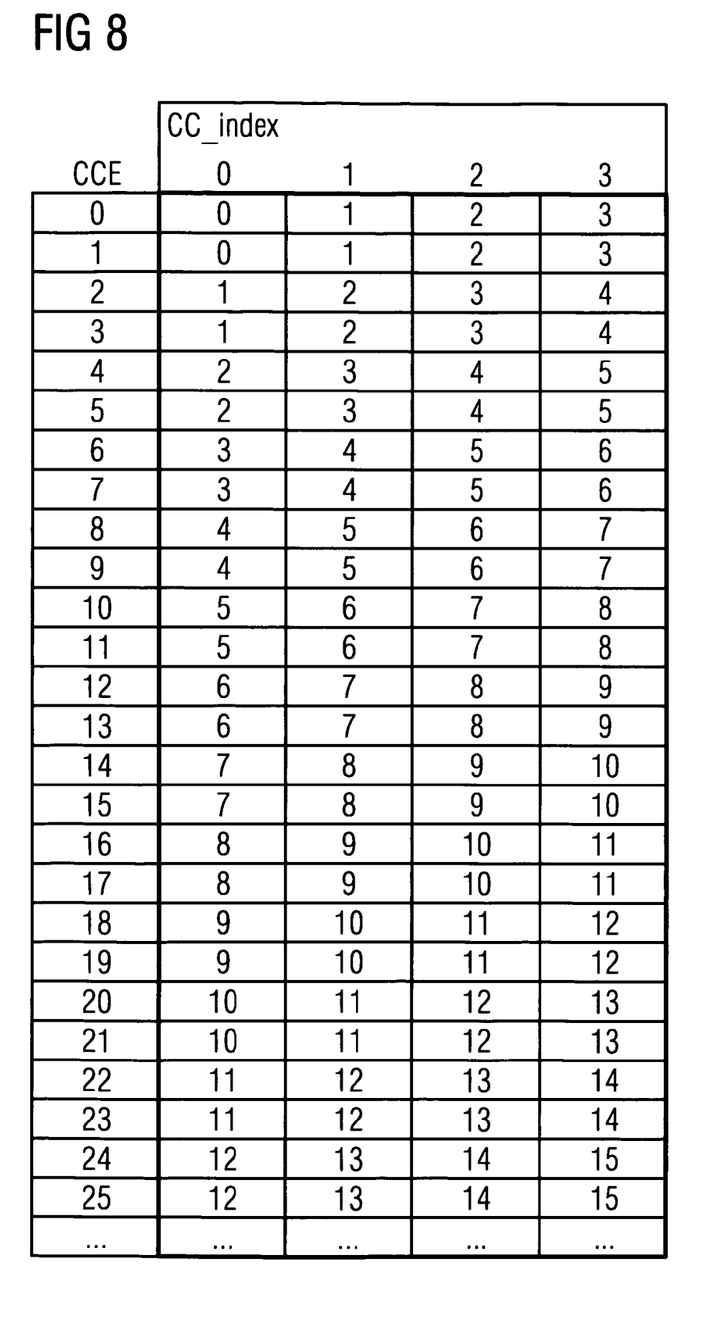
FIG. 8 shows a mapping between a CCE (control channel element) and a component carrier index.

FIG. 8 shows a table which lists for each CCE index, the available CC_index.

FIG. 8 shows the mapping from CCE index and CC_index to the $n_{res}$=cross-CC-ACK/NACK resource index. E.g. if CCE index=15 and CC_index=2 the $n_{res}$=9. Hence the corresponding ACK/NACK would be transmitted on the $10^{th}$ (since the indexing starts from 0) resource in region 154. Thus the resource indexes (0, 1, 2,) are relativistic ACK/NACK resource indexes corresponding to the different PDCCH/PDSCH allocations (CCE corresponds to the first CCE of the PDCCH). "0" corresponds to the first PUCCH Format 1a/1b resource located on dynamic cross-CC ACK/NACK space (154), "1" is the second resource, and so on.

Figure 9:
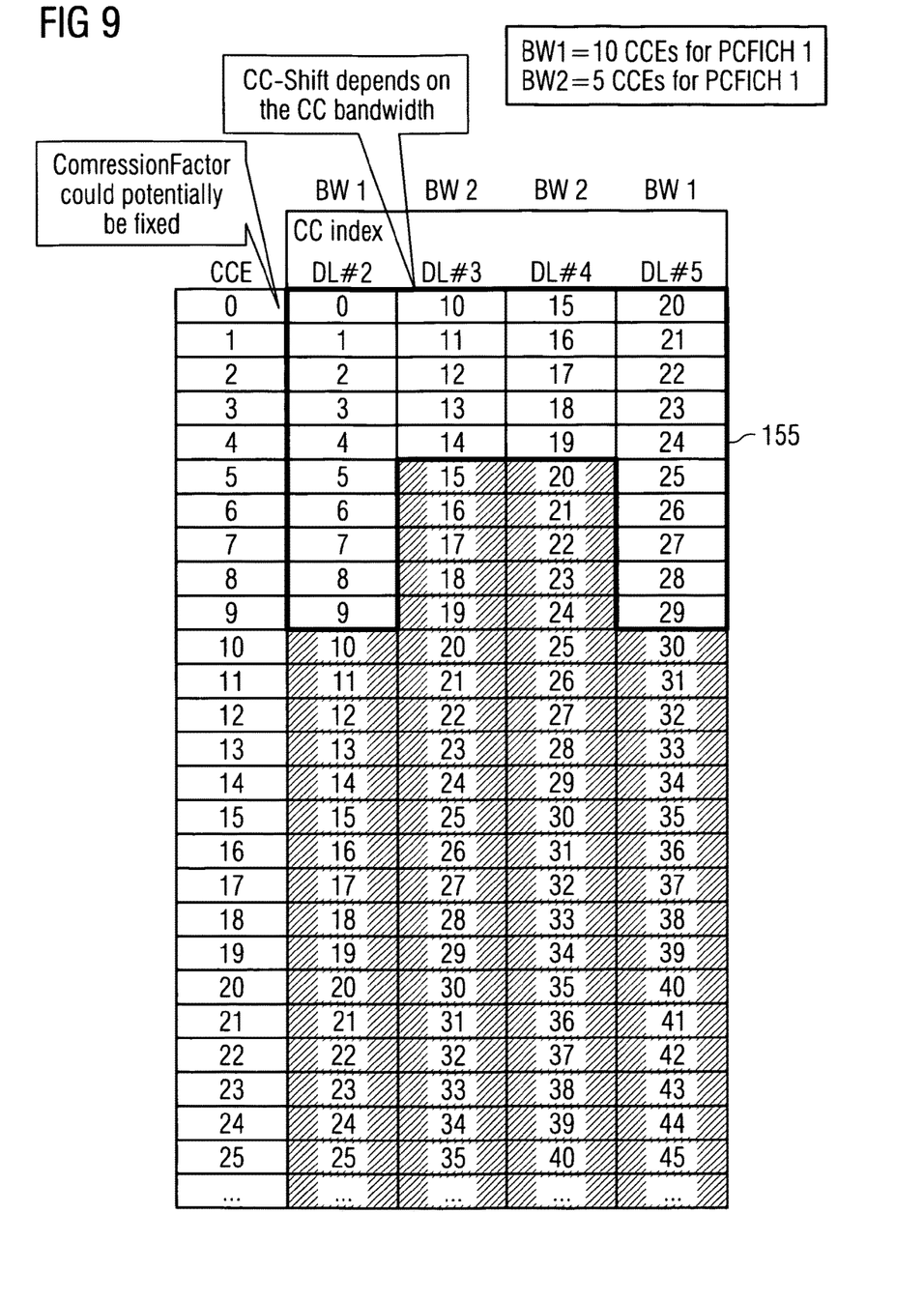
FIG. 9 shows a second table of a mapping between a CCE and the component carrier index.

Reference is made to FIG. 9 which shows a similar table to FIG. 8. In this table, since the bandwidth of different CCs is different (here BW1 and BW2), the number of CCEs corresponding to the PCFICH varies as well. It may be beneficial from the scheduler point of view to guarantee as little overlap between CC-specific ACK/NACK resources corresponding to area with PCFICH=1 as possible. This mapping is indicated by area 155 of the table of FIG. 9.

Area 155 corresponds to the CC-specific ACK/NACK with PCFICH=1. The cross-CC ACK/NACK space is arranged in such that there are no collisions between ACK/NACK resources corresponding to CCEs with PCFICH=1 (in this example four carriers have different BW values. Thus the number of CCEs with a given PCFICH are different.

FIG. 8 thus shows $n_{res}$ as a function of CCE and the CC-index using Equation 1. In this example there are (up to) four cross-CCs, the parameter Compression Factor is set equal to 2 and CC_shift=1. In this example there is a many-to-one mapping between the CCE index (running from 0 up to 25 in FIG. 8) and the PUCCH resource $n_{res}$ associated with the CCE index. The adjustment of the parameters Compression Factor and CC_shift allows for scaling of the uplink signalling overhead and/or the blocking probability/amount of scheduling limitations. In a preferred embodiment, one of the CCs utilizes the regular ACK/NACK space and hence may be outside of the cross-CC resource allocation.

This mapping rule may provide also fully non-overlapping ACK/NACK resources corresponding to different DL CCs. This may be achieved by the following parameter setting:

$$CompressionFactor = \frac{1}{\text{number of } DL\ CCs} \text{ (e.g., } 1/4\text{)}$$

CC_shift=1.

In one embodiment the parameters Compression Factor and CC_shift are system or cell or CC-specific parameters that are signalled to all UEs using higher layer signalling (e.g. via a Master Information Block or some of the System Information Blocks). This embodiment may be configured to support a fully dynamic approach and/or may allow for the eNodeB implementation to select a suitable trade-off between UL overhead and the degree of scheduler restrictions.

In another embodiment the parameter CC_Shift may vary between CCs in a predetermined way, e.g., according to $$n_{res} = \left\lfloor \frac{CCE}{CompressionFactor} \right\rfloor + CC\_shift(CC\_index)).$$

This embodiment may avoid the need to signal any additional parameters. There may be limited scheduler restrictions. For example there may be no restrictions if PCFICH=1 is used on all CCs—The scheduler can e.g. place DL grants to the CCEs first (lowest index) and then the UL grants to minimize resource blocking. On special case of this embodiment is that CC_shift(CC_index) is derived based on instantaneous size of the CC-specific CCE space (=dynamic ACK/NACK region). This information can be obtained by receiving the CC-specific PDFICH.

CC_Shift may depend also on the bandwidth of the component carrier. An example of such case is shown in the table of FIG. 9. FIG. 9 shows that CC_Shift is derived based on the number of CCEs assuming PCFICH=1 for each CC separately. The LTE Rel-8 compatible CC uses the same mapping as in LTE Rel-9. One way to define the value of CC_Shift is to set it to be the same as the number of CCEs corresponding to PCFICH=1 in that CC. The Compression Factor may be fixed to one. In such a case there may be no need to signal either of the two parameters.

Embodiments of the present invention may be scalable with the number of CCs. Embodiments of the invention may be scalable with the number of CCEs. Implicit mapping may be maintained in some embodiments of the present invention. Embodiments of the present invention may provide an overhead reduction as compared to the fully interested one-to-one mapping. In embodiments of the invention, the overhead may scale according to the system bandwidth. Some embodiments of the present invention may have a low overhead and/or flexible scheduling compared to explicit signalling of the PUCCH resource.

Some embodiments of the present invention are robust so that there are no problems if a user equipment fails to decode the PSFICH for some CCs. Embodiments of the present invention may be compatible with legacy versions of the mapping.

The required data processing apparatus and functions of a base station apparatus as well as an appropriate communication device may be provided by means of one or more data processors. The described functions may be provided by separate processors or by an integrated processor. The data processing may be distributed across several data processing modules. A data processor may be provided by means of, for example, at least one chip. Appropriate memory capacity in the form of at least one memory can also be provided in the relevant nodes. An appropriately adapted computer program code product or products may be used for implementing the embodiments, when loaded on an appropriate data processing apparatus, for example for a processor apparatus 13 associated with the base station 12 shown in FIG. 1 and/or one or more of the data processing apparatus 3, 4 and 9 of the mobile communication device 1 of FIG. 2. The program code product for providing the operation may be stored on, provided and embodied by means of an appropriate carrier medium. An appropriate computer program can be embodied on a computer readable record medium. A possibility is to download the program code product via a data network.

It is noted that whilst embodiments have been described in relation to LTE-Advanced, similar principles can be applied to any other communication system where a composite carrier comprising a multiple of component carriers is employed. Also, instead of carriers provided by a base station a composite carrier comprising component carriers may be provided by a communication device such as a mobile user equipment. For example, this may be the case in application where no fixed equipment provided but a communication system is provided by means of a plurality of user equipment, for example in adhoc networks. Therefore, although certain embodiments were described above by way of example with reference to certain exemplifying architectures for wireless networks, technologies and standards, embodiments may be applied to any other suitable forms of communication systems than those illustrated and described herein.

Embodiments of the invention have been described in relation to acknowledgement information in the form of ACK/NACK. Alternative embodiments of the invention may be used with any other suitable form of acknowledgement information.

Embodiments of the invention have been described in relation to acknowledging downlink packets. Embodiments of the invention may alternatively or additionally be used to acknowledge uplink packets.

Embodiments of the invention have been described in relation to PUCCH and PDCCH channels. Embodiments of the invention may be used with any other suitable channels.

It is also noted herein that while the above describes exemplifying embodiments of the invention, there are several variations and modifications which may be made to the disclosed solution without departing from the scope of the present invention.

The invention claimed is:

1. A method comprising:
determining resource index information which defines a position for acknowledgement information in a first channel, said acknowledgment information being sent in response to resources scheduled via a second channel on at least two component carriers, wherein said resource index information is determined in response to at least one parameter dependent on allocation of resources of said second channel and on at least one parameter relating to configuration of said first channel and comprising using the following equation to define the resource index where $$n_{res} = \left\lfloor \frac{CCE}{CompressionFactor} \right\rfloor + (CC\_index) \cdot (CC\_shift),$$

where CCE and CC_index are respectively a first control channel element index and a component carrier index of the corresponding second channel, CC_shift defines a separation between indices of said first channel resources between adjacent component carriers, Compression Factor defines the number of neighbouring first channel resources within a component carrier which shares a common resource index, $\lfloor \bullet \rfloor$ is the floor-operation and $n_{res}$ is the r resource index,
wherein space is provided on said first channel for providing for said acknowledgment information, said space comprising a first part and a second part;
wherein said first part is associated with a single downlink component carrier and wherein said determining resource index information for said first part uses implicit resource allocation; and
wherein said second part is associated with at least one other downlink component carrier and wherein said determining resource index information for said second part uses explicit resource allocation specifically identifying the resource to be used.

2. The method as claimed in claim 1, wherein said first channel is an uplink channel.

3. The method as claimed in claim 1, wherein said first channel comprises a Physical Uplink Control Channel.

4. The method as claimed in claim 1, wherein said resource index information is determined in response to at least one parameter dependent on allocation of resources of said second channel and on at least one parameter relating to configuration of said first channel and wherein determining resource index information comprises determining a resource index value for adding to an index starting position.

5. The method as claimed in claim 1, wherein said resource index information is determined in response to at least one parameter dependent on allocation of resources of said second channel and on at least one parameter relating to configuration of said first channel and wherein said at least one parameter dependent on allocation of resources of said second channel comprises at least one of: a predefined index of a control channel element of said second channel; an index of a lowest control element of said second channel; and a component carrier index.

6. The method as claimed in claim 1, wherein said resource index information is determined in response to at least one parameter dependent on allocation of resources of said second channel and on at least one parameter relating to configuration of said first channel and wherein said at least one parameter relating to configuration of said first channel comprises at least one of: a number of control channel elements with neighboring resources within a component carrier which shares common resource index information; and a separation of resource index information of first channel resources between adjacent component carrier resource index information.

7. The method as claimed in claim 1, wherein said resource index information is determined in response to at least one parameter dependent on allocation of resources of said second channel and on at least one parameter relating to configuration of said first channel and comprising using the following equation to define the resource index where $$n_{res} = \left(\left\lfloor \frac{CCE}{CompressionFactor} \right\rfloor + (CC\_index) \cdot (CC\_shift)\right) \bmod N_{res}$$

where $N_{res}$ is pre-defined maximum value where CCE and CC_index are respectively a first control channel element index and a component carrier index of the corresponding second channel, CC_shift defines a separation between indices of said first channel resources between adjacent component carriers, Compression Factor defines the number of neighbouring first channel resources within a component carrier which shares a common resource index, $\lfloor \bullet \rfloor$ is the floor-operation and $n_{res}$ is the r resource index.

8. The method as claimed in claim 1, wherein said first part and said second part at least partially overlap.

9. The method as claimed in claim 1, comprising one of signaling and receiving a starting point of at least one of: said space; said first part of said space; and said second part of said space.

10. The method as claimed in claim 1, wherein said first part comprises reserved space for acknowledgement of dynamically scheduled component carriers of said second channel as defined in Third Generation Partnership Project Long Term Evolution Release 8.

11. The method as claimed in claim 1, wherein said resource index information is arranged to define a position in said second part.

12. The method as claimed in claim 1, wherein said second part is associated with at least one downlink component carrier and wherein determining resource index information for said second part uses implicit resource allocation.

13. The method as claimed in claim 1, wherein determining resource index information for said second part uses at least one of: semi persistent; persistent resource allocation.

14. The method as claimed in claim 1, wherein said resource index information is associated with dynamically scheduled component carriers of said second channel.

15. The method as claimed in claim 1, wherein said second channel is a downlink channel.

16. The method as claimed in claim 1, wherein said second channel is a physical downlink control channel.

17. The method as claimed in claim 1, wherein said acknowledgment information comprise ACK/NACK.

18. The method as claimed in claim 1, comprising transmitting said acknowledgement information in said position in said first channel defined by said determined resource index.

19. The method as claimed in claim 1, wherein determining said resource index information further comprises using a predefined mapping between a resource on said second channel and a resource on said first channel for dynamic scheduling.

20. The method as claimed in claim 1, wherein said method is performed in at least one of a user equipment and a base station.

21. The method as claimed in claim 1, wherein said resource index information is determined in response to at least one parameter dependent on allocation of resources of said second channel and on at least one parameter relating to configuration of said first channel.

22. The method as claimed in claim 1, wherein implicit resource allocation comprises dynamic allocation of resources and explicit resource allocation comprises allocation of resources in a static or semi-static manner.

23. The method as defined in claim 1, wherein implicit resource allocation comprises a one to one mapping between the index of the lowest control channel element of the physical downlink control channel of said single downlink component carrier and the index of the uplink ACK/NACK resource of the physical uplink control channel of said single downlink component carrier, and wherein explicit resource allocation comprises allocation of resources by separate signaling for each user equipment, using radio resource control.

24. A non-transitory computer readable medium storing a program of instructions, execution of which by at least one processor configures an apparatus to perform the method of claim 1.

25. An apparatus comprising;
at least one processor; and
at least one non-transitory memory including computer program code, the at least one memory and the computer program code configured to, with the at least one processor, cause the apparatus to at least to perform:
determining resource index information which defines a position for acknowledgement information in a first channel, said acknowledgment information being sent in response to resources scheduled via a second channel on at least two component carriers, wherein said resource index information is determined in response to at least one parameter dependent on allocation of resources of said second channel and on at least one parameter relating to configuration of said first channel and comprising using the following equation to define the resource index where $$n_{res} = \left\lfloor \frac{CCE}{CompressionFactor} \right\rfloor + (CC\_index) \cdot (CC\_shift),$$

where CCE and CC_index are respectively a first control channel element index and a component carrier index of the corresponding second channel, CC_shift defines a separation between indices of said first channel resources between adjacent component carriers, Compression Factor defines the number of neighbouring first channel resources within a component carrier which shares a common resource index, $\lfloor \cdot \rfloor$ is the floor-operation and $n_{res}$ is the r resource index,
wherein space is provided on said first channel for providing for said acknowledgment information, said space comprising a first part and a second part;
wherein said first part is associated with a single downlink component carrier and wherein said determining resource index information for said first part uses implicit resource allocation; and
wherein said second part is associated with at least one other downlink component carrier and wherein said determining resource index information for said second part uses explicit resource allocation specifically identifying the resource to be used.

26. A base station or user equipment copmising the apparatus of claim 25.

* * * * *

UNITED STATES PATENT AND TRADEMARK OFFICE
CERTIFICATE OF CORRECTION

PATENT NO. : 9,819,451 B2
APPLICATION NO. : 13/521563
DATED : November 14, 2017
INVENTOR(S) : Timo Erkki Lunttila and Esa Tapani Tiirola It is certified that error appears in the above-identified patent and that said Letters Patent is hereby corrected as shown below:

In the Claims

In Claim 26:
Column 16, Line 44, "copmising" should be deleted and --comprising-- should be inserted.

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*